Feb. 25, 1930. J. PEEBLES 1,748,898
APPARATUS FOR CLEANING SAND FILTER BEDS AND THE LIKE
Filed Aug. 23, 1928 2 Sheets-Sheet 1

INVENTOR.
J. PEEBLES
BY
ATTYS.

Feb. 25, 1930.  J. PEEBLES  1,748,898
APPARATUS FOR CLEANING SAND FILTER BEDS AND THE LIKE
Filed Aug. 23, 1928  2 Sheets-Sheet 2

INVENTOR.
J. PEEBLES.
By Featherstonhaugh Co.
ATTYS.

Patented Feb. 25, 1930

1,748,898

UNITED STATES PATENT OFFICE

JAMES PEEBLES, OF DALRYMPLE, SCOTLAND REISSUED

APPARATUS FOR CLEANING SAND FILTER BEDS AND THE LIKE

Application filed August 23, 1928, Serial No. 301,655, and in Great Britain August 23, 1927.

This invention relates to apparatus for cleaning sand or other comminuted material in filter beds and the like and has for an object to provide means whereby the dirty and heavily coated sand or the like forming the upper stratum of the bed may be effectively cleaned independently of the body sand, thus preventing the formation of cracks, mudballs and clogged areas at the surface of the bed.

In a sand filter bed which is cleaned by agitation with air and/or water introduced from an under drain the upper stratum of the bed is so remote from the region of agitation that it is not completely broken up and often coagulates, to form clogged areas liable to occasion surface cracks and crevices so that when filtration is restarted the water traverses the cracks and crevices in consequence of which the filtration efficiency of the bed is impaired by reduction of effective filtration area.

Apparatus according to the invention includes a structure movable on the filter bed or the like and sustaining means for scooping up the surface of the sand or the like, means for impelling jets of water against the sand or the like so scooped up, and impact-receiving means on which the jets of water admixed with sand or the like impinge whereby coagulated masses of sand or the like are disintegrated.

The movable structure may be constituted by a carriage travelling on rails and carrying a pump with driving motor, which latter may serve also to propel the carriage, the delivery side of the pump being in communication with a conduit suspended from the carriage and fitted with nozzles for directing against sand scooped up by a scoop also suspended from the carriage jets of water delivered by the pump.

The impact-receiving means may be constituted by a plate also suspended from the carriage and presenting concavities in register with the nozzles.

Impurities in the surface sand may be swept towards drains while clean water enters the bed, the travelling apparatus sustaining a partition between the clean and the dirty water sections.

For cleaning filters of the pressure type the cleaning apparatus may be mounted for rotation on a vertical axis.

Figure 1:
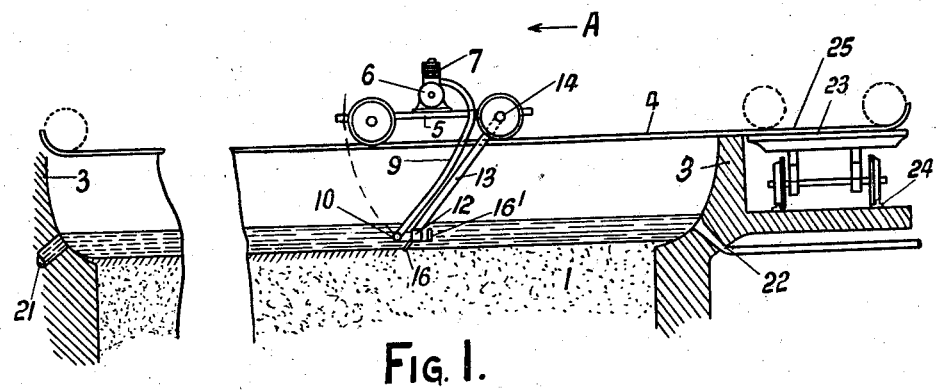
Figure 3:
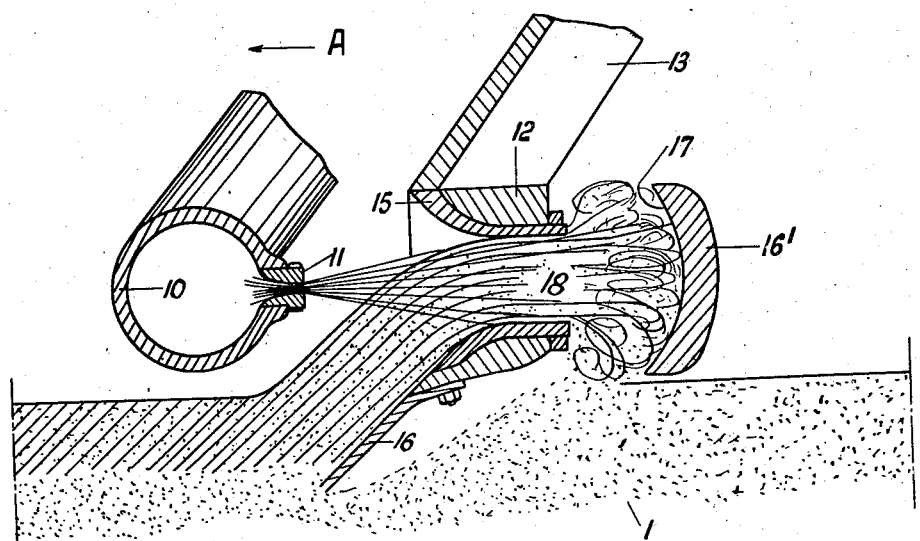
Figure 2:
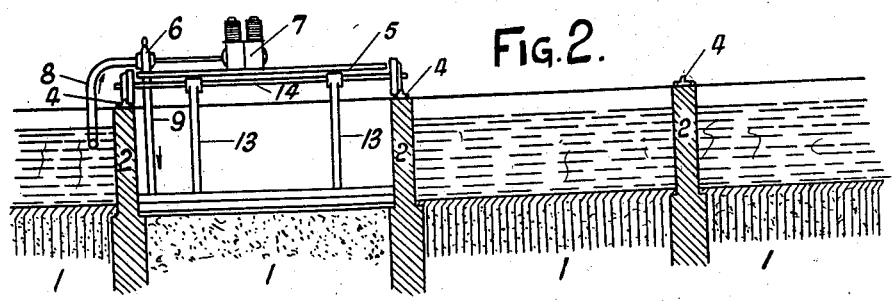
Figure 4:
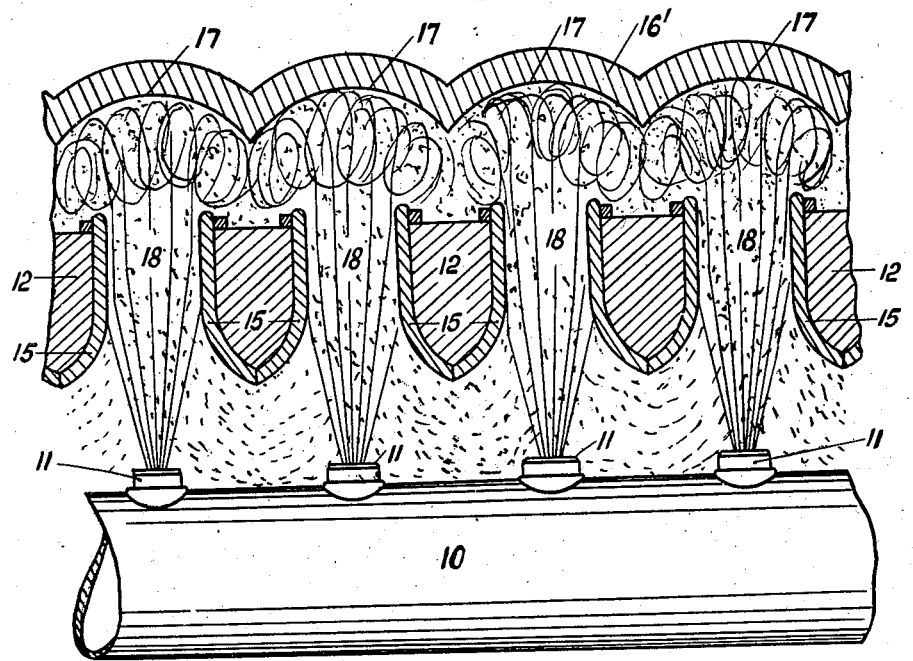
Figure 5:
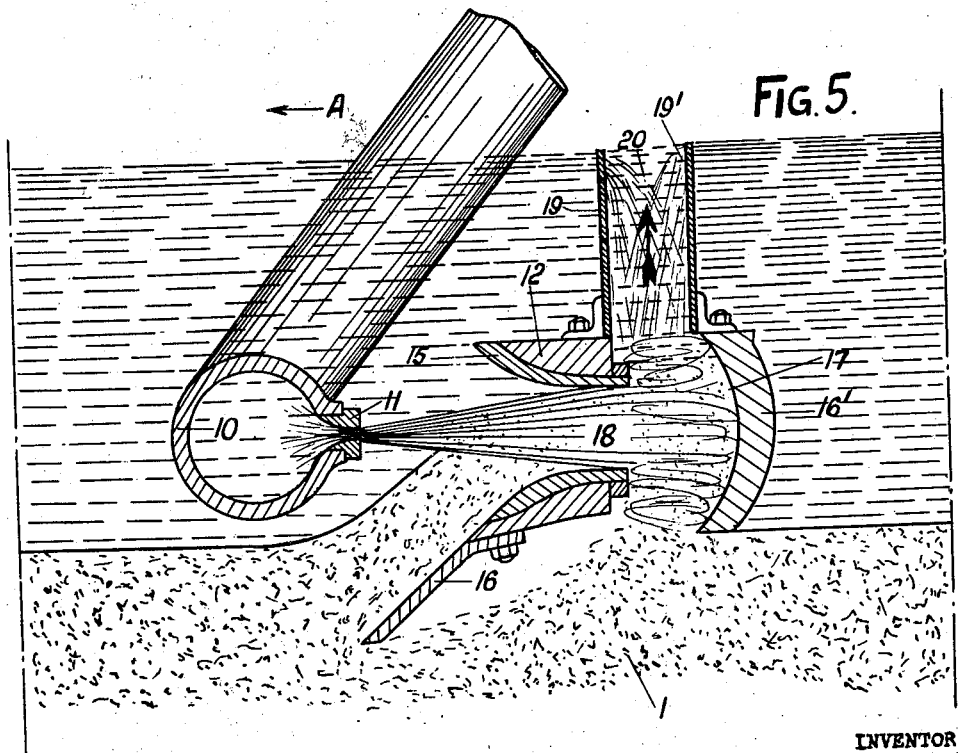

In the accompanying drawings Fig. 1 is a vertical longitudinal section showing a filter bed cleaning apparatus; Fig. 2 is a vertical section at right-angles to Fig. 1; Fig. 3 is a fragmentary detail view of the cleaning apparatus drawn to a larger scale; Fig. 4 is a fragmentary detail plan view, part horizontal section of the apparatus shown in Fig. 3; Fig. 5 is a view similar to Fig. 3 showing a slightly modified construction.

Referring to the drawings, 1 denotes each of a battery of juxtaposed rectangular filter beds confined between side walls 2 and end walls 3 (Fig. 1).

Adapted to run on rails 4 laid on top of the side walls 2 is a wheeled carriage 5 carrying a pump 6 and driving motor 7, which pump is adapted when in operation to draw water by way of a suction pipe 8 (Fig. 2) from one filter bed and to discharge said water by way of a flexible pipe 9 to a pipe 10 extending transversely of the adjoining filter bed and fitted with spaced renewable nozzles 11.

The pipe 10 is spaced forwardly of and carried by a transverse bar 12 connected by arms 13 to the rear axle 14 of the carriage 5, the pipe 10 and bar 12 being adapted to be swung about the axis of said axle 14 by means, not shown, whereby they may be moved into and out of operative position as required.

The bar 12 is formed with spaced orifices each of which is disposed opposite a nozzle 11 and fitted with a renewable bush 15 presenting a convergent opening 18.

Secured to the lower face of the bar 12 is a scoop plate 16 adapted, when the bar is lowered into operative position, to dig into the surface of the sand as shown in Figs. 1, 3 and 5.

Spaced from the bar 12 and carried thereby is an impact plate 16' presenting concavities 17 facing the delivery openings 18 presented by the bushes 15.

In the modified construction shown in Fig. 5 the bar 12 and the impact plate 16' are surmounted by wall plates 19, 19' defining a channel passage 20, the upper edge of the plate 19' being slightly higher than the upper edge of the plate 19.

In operation, to effect cleaning of a filter bed, the pipe 10 and arm 12 are lowered into operative position with the scoop plate 16 digging into the surface of the sand, the pump 6 is started and the carriage is traversed slowly in the direction indicated by the arrow A from the front to the rear end of the filter bed. The jets of water issuing from the nozzles 11 carry the sand scooped up by the plate 16 through the openings 18 and cause it forcibly to impinge on the concave faces 17 of the impact plate 16' whereby the coagulated masses of surface sand are thoroughly disintegrated, the sand falling on to the surface of the bed through the gap between the bar 12 and the plate 16'.

It will be understood that in the forward movement of the apparatus, i. e., movement in the direction indicated by the arrow A, impurities contained in the surface sand are swept towards the filter bed drain 21 (Fig. 1), clean water entering by way of the inlet 22 positioned at the opposite end of the filter bed.

In the construction shown in Fig. 5 the wall plates 19, 19' form a partition between the clean water section and the dirty water section, the plate 19' being located on the clean water side so that in the forward movement of the apparatus the only escape for the clean water is over the upper edge of the plate 19' or past the ends of the apparatus.

When the carriage has reached the rear end of the filter bed the pipe 10 and arm 12 may be swung upwardly clear of the bed and the carriage moved back to the front end of the bed ready for another cleaning traverse.

In order that one apparatus may serve a battery of filter beds there is provided a bogie 23 (Fig. 1) adapted to run on rails 24 extending transversely of the filter beds, said bogie carrying rails 25 adapted to be brought into register with the rails 4 so that the carriage 5 may be run back on the bogie 23 and transported to a position opposite another filter bed.

In the case of an end filter the pump 6 may draw water by way of the pipe 8 from a trough disposed alongside the filter bed.

As will be understood, after the upper stratum of the bed has been cleaned by the apparatus described the body sand may be washed with ease by agitation with air and/or water, it being readily understood that the surface of the sand then presents an equitable area for passage of the air and water.

What I claim is:

1. Apparatus for cleaning sand or other comminuted material in filter beds including a carriage movable over said beds, a bar sustained by said carriage and presenting convergent openings, a scoop fitted to said bar for scooping up the surface of the comminuted bed material, a pump sustained by said carriage, a connection for leading water from one of said beds to said pump, a pipe connected to the delivery side of said pump, nozzles fitted to said last mentioned pipe in register with said convergent openings and an impact plate sustained by said bar on the opposite side of said scoop from said nozzles.

2. Apparatus for cleaning sand or other comminuted material in filter beds including a carriage movable over said beds, a bar sustained by said carriage and presenting convergent openings, a scoop fitted to said bar for scooping up the surface of the comminuted bed material, a pump sustained by said carriage, a connection for leading water from one of said beds to said pump, a pipe connected to the delivery side of said pump, nozzles fitted to said last mentioned pipe in register with said convergent openings, and wall plates sustained by said bar and defining a partition separating the water above the cleaned comminuted material and the water above the comminuted material to be cleaned.

3. Apparatus for cleaning sand or other comminuted material in a filter bed having an outlet at one end, including a carriage movable over said bed towards said outlet, a bar sustained by said carriage and presenting convergent openings, a scoop fitted to said bar for scooping up the surface of the comminuted bed material, a pump sustained by said carriage, a connection for leading water to said pump, a pipe connected to the delivery side of said pump, nozzles fitted to said last mentioned pipe in register with said convergent openings, and a pair of wall plates sustained by said bar and defining a partition separating the water above the cleaned comminuted material and the water above the comminuted material to be cleaned, the wall plate remote from said outlet extending to a higher level than the wall plate nearer said outlet.

In testimony whereof I have signed my name to this specification.

JAMES PEEBLES.